United States Patent [19]

Ichikawa

[11] Patent Number: 4,543,867

[45] Date of Patent: Oct. 1, 1985

[54] SLITTER KNIFE HOLDER

[75] Inventor: Shigeru Ichikawa, Fujinomiya, Japan

[73] Assignee: Meisan Ltd., Co., Shizuoka, Japan

[21] Appl. No.: 592,228

[22] Filed: Mar. 22, 1984

[51] Int. Cl.$^4$ .......................... B23D 19/04; B26D 1/24

[52] U.S. Cl. .......................................... 83/502; 83/522; 83/501; 83/701; 33/DIG. 13

[58] Field of Search ................. 83/501, 503, 502, 504, 83/522, 701; 33/DIG. 13

[56] References Cited

U.S. PATENT DOCUMENTS

| | | | |
|---|---|---|---|
| 2,487,681 | 11/1949 | Weisselberg | 33/DIG. 13 |
| 3,143,024 | 8/1964 | Markowski | 83/504 X |
| 3,185,010 | 5/1965 | Printz et al. | 83/504 X |
| 4,143,572 | 3/1979 | Schönmeier | 83/501 |
| 4,232,265 | 11/1980 | Smirnov | 33/DIG. 13 |
| 4,464,419 | 8/1984 | Horn | 33/DIG. 13 |

*Primary Examiner*—Donald R. Schran

*Attorney, Agent, or Firm*—Brumbaugh, Graves, Donohue & Raymond

[57] ABSTRACT

A slitter knife holder has a rod for supporting a slitter knife. Strain gauges are attached to the rod. There is provided a conversion circuit for converting changes in electric resistance of the strain gauges due to the deflection of the rod caused by the pressure of contact of the upper blade with the lower blade of the slitter knife into a signal indicative of the pressure of contact of the upper blade with the lower blade. The signal from the conversion circuit may be applied to a contact pressure monitor for indicating the signal directly to an operator or to an automatic contact-pressure control system.

6 Claims, 3 Drawing Figures

SLITTER KNIFE HOLDER

BACKGROUND OF THE INVENTION

1. Field of the Invention

This invention relates to a slitter knife holder for carrying a slitter knife as used in a slitter for slitting a sheet of material such as paper into two or more sheet having a predetermined width.

2. Description of the Prior Art

A conventional slitter knife comprises an upper blade and a lower blade. Generally, the lower blade is fixed in the direction of the axis of rotation of the lower blade, and the upper blade is biased in the direction of the axis of rotation of the upper blade by a spring so that the upper blade may lap over and contact with the lower blade at a pressure. The pressure of contact of the upper blade with the lower blade must be maintained at a predetermined value which is proper to the nature and the thickness of a sheet-like material to be slitted. In the conventional slitter knife wherein the contact pressure of the upper blade with the lower blade is produced by the compressing force of the spring as described above, an operator set a necessary contact pressure by adjusting the degree of compression or displacement of the spring. However, such conventional slitter knife holder does not have means for indicating the contact pressure directly to the operator. Therefore, the operator had to use his head to make such adjustment, and thus it was unavoidable that there was an outstanding difference in such adjustment among individual operators. Moreover, in such a slitter, since the slitter knife wears, it is often necessary to replace the knife by a new one. The operator had to make such an adjustment for each replacement. It was very difficult for the operator to always set the contact pressure to a same proper value for each adjustment by using his head. For these reasons, in conventional slitters, there was a large difference the cantact pressure, thereby resulting in large differences in the life and the cutting quality of the slitter knives.

Therefore, it is an object of this invention to provide a slitter knife holder wherein the contact pressure of the slitter knife can be indicated directly to an operator so as to permit the operator to easily and accurately set a desired contact pressure on the basis of the indication.

It is another object of this invention to provide a slitter knife holder which makes it possible to automatically control the contact-pressure of the upper blade with the lower blade.

SUMMARY OF THE INVENTION

According to this invention, there is provided a slitter knife holder having a rod for supporting a slitter knife, comprising strain gauges attached to the rod, and a conversion circuit for converting changes in electric resistance of the strain gauges due to the deflection of the rod caused by the pressure of contact of the upper blade with the lower blade of the slitter knife into a signal indicative of the pressure of contact of the upper blade with the lower blade.

An embodiment of this invention will now be described by way of example with reference to the accompanying drawing.

DESCRIPTION OF THE PREFERRED EMBODIMENTS

Figure 1:
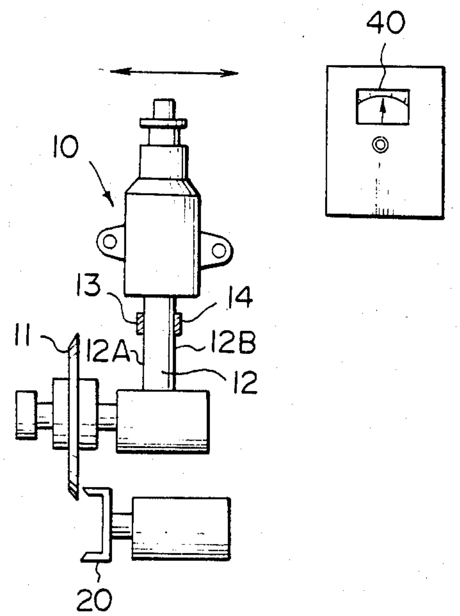
FIG. 1 is a schematic diagram of one embodiment of a slitter knife holder according to this invention.

In FIG. 1 there is schematically illustrated a slitter knife holder according to this invention. The slitter knife holder 10 comprises a rod 12 for supporting an upper blade 11 of a slitter knife. The slitter knife holder 10 can be moved to make the upper blade 11 contact with the lower blade 20 of the slitter knife. When the upper blade 11 is in contact with the lower blade 20, there is caused a very small deflection in the rod 12. A first strain gauge 13 is attached to one side surface 12A of the rod 12 which surface is at the compression side of the deflection, and a second strain gauge 14 similar to the first strain gauge 13 is attached to the opposite side surface 12B of the rod 12 which surface is at the tension side of the deflection.

Figure 2:
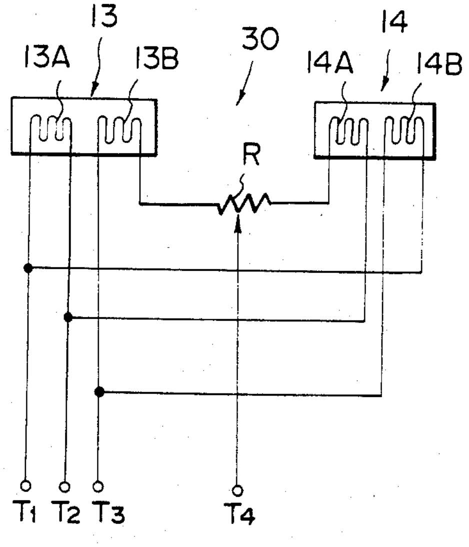
FIG. 2 is a schematic diagram of a strain-voltage conversion circuit as associated with the slitter knife holder of FIG. 1.
Figure 3:
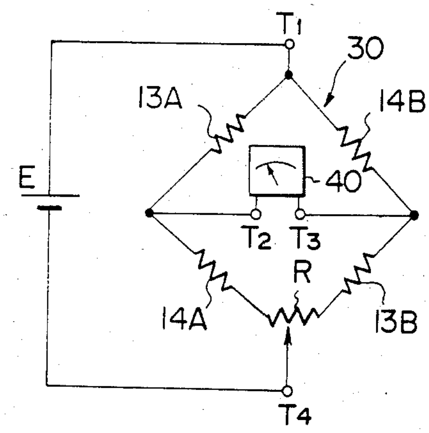
FIG. 3 is a circuit diagram showing a connection of the strain-voltage conversion circuit of FIG. 2, a source of power and a voltmeter for contact-pressure monitor.

The first and second strain gauges 13 and 14 are electrically connected so as to form a strain-voltage conversion circuit 30 as shown in FIG. 2. As shown in FIG. 3, a source of power E and a voltmeter 40 for contact-pressure monitor are connected to the strain-voltage conversion circuit 30 of FIG. 2. As best seen in FIG. 3, the strain resistances 13A and 13B of the first strain gauge 13 and the strain resistances 14A and 14B of the second strain gauge 14 respectively constitute each of the arms of a bridge circuit. A slide resistance R may be provided for zero adjustment of the strain-voltage conversion circuit 30. The sliding arm of the resistance R can be adjustably positioned so that the bridge circuit of FIG. 3 may be in balance to output a zero volt between the terminals T2 and T3 when the contact pressure of the upper blade 11 with the lower blade 20 is zero, thereby causing no deflection of the rod 12 and therefore neither compressive force nor tensile force is applied to the first and second strain gauges 13 and 14. When the upper blade 11 makes contact with the lower blade 20 at a contact pressure larger than zero, the rod 12 is deflected accordingly, and then a compressive force is applied to the strain resistances 13A and 13B of the first strain gauge 13 at the compression side 12A of the rod 12 and a tensile force is applied to the strain resistances 14A and 14B of the second strain gauge 14 at the tension side 12B of the rod 12. Since the resistances of the strain resistances 13A, 13B, 14A and 14B are changed accordingly, the bridge circuit 30 becomes out of balance to output a voltage larger than zero between the terminals T2 and T3. As a result, the voltage indicates the contact pressure of the upper blade 11 with the lower blade 20. Thus, the voltmeter 40 connected between the terminals T2 and T3 can read the contact pressure.

The voltmeter 40 is located in the vicinity of the slitter knife holder 10 so that an operator can adjust the contact pressure of the upper blade with the lower blade, reading the voltmeter 40. If it is desired to set the contact pressure to a proper value, the operator may adjust the movement of the upper blade toward the lower blade or a contact-pressure adjusting spring of the upper holder so that the voltmeter 40 reads the proper value.

As seen from the above, in the slitter knife holder of this invention, since the operator can set the contact pressure, reading the voltmeter for contact-pressure monitor, it will be possible to easily and accurately set any desired contact pressure at all times.

Although in the embodiment described above the output of the strain-voltage conversion circuit 30 is applied to the voltmeter 40, according to another embodiment of this invention, the output of the strain-voltage conversion circuit 30 may be applied to an automatic contact-pressure control system (not shown) in order to automatically control the contact-pressure.

I claim:

1. A slitter knife holder apparatus for a slitter knife, the slitter knife including an upper blade and a lower blade, the lower blade being fixed in the direction of the axis of rotation of the lower blade and the upper blade being biased in the direction of the axis of rotation of the upper blade so that an overlapping portion of the upper blade is biased toward an adjacent portion of the lower blade, said slitter knife holder apparatus comprising a rod for supporting the upper blade of the slitter knife, strain gauges attached to the rod and a conversion circuit for converting changes in electric resistance of the strain gauges due to the deflection of the rod caused by the pressure of the upper blade against the lower blade into a signal indicative of said pressure.

2. A slitter knife holder apparatus as set forth in claim 1 including a pressure monitor for indicating the signal from said conversion circuit directly to an operator.

3. A slitter knife holder apparatus as set forth in claim 1 wherein said strain gauges comprise a first strain gauge attached to one side surface of the rod, which surface is at the compression side of deflection of the rod, and a second strain gauge attached to the opposite side surface of the rod, which surface is at the tension side of deflection of the rod, and wherein said conversion circuit is a strain-voltage conversion circuit comprising a bridge circuit including the first and second strain gauges as each arm of the bridge circuit.

4. A slitter knife holder apparatus as set forth in claim 2 wherein said pressure monitor is a voltmeter connected to the output of said strain-voltage conversion circuit.

5. A slitter knife holder apparatus as set forth in claim 4 wherein said voltmeter is located in proximity to the slitter knife.

6. A slitter knife holder apparatus as set forth in claim 1 including automatic pressure control means for automatically controlling the pressure of said upper blade with said lower blade.

* * * * *